(12) United States Patent
Ota et al.

(10) Patent No.: US 6,759,108 B1
(45) Date of Patent: Jul. 6, 2004

(54) LAMINATED PLASTIC MOLDED BODY

(75) Inventors: Akiho Ota, Isehara (JP); Masato Suzuki, Isehara (JP)

(73) Assignee: Yoshino Kogyoshocco., Ltd., Tokyo (JP)

( * ) Notice: Subject to any disclaimer, the term of this patent is extended or adjusted under 35 U.S.C. 154(b) by 0 days.

(21) Appl. No.: 09/959,604

(22) PCT Filed: May 12, 2000

(86) PCT No.: PCT/JP00/03058
§ 371 (c)(1),
(2), (4) Date: Oct. 31, 2001

(87) PCT Pub. No.: WO01/85450
PCT Pub. Date: Nov. 15, 2001

(51) Int. Cl.⁷ .................................................. B32B 1/02
(52) U.S. Cl. ................ 428/36.7; 428/475.5; 428/475.8; 428/483
(58) Field of Search .............................. 428/367, 475.8, 428/475.5, 483

(56) References Cited

U.S. PATENT DOCUMENTS

| | | | |
|---|---|---|---|
| 4,398,642 A | * | 8/1983 | Okudaira et al. |
| 4,501,781 A | | 2/1985 | Kushida et al. ................ 428/35 |
| 4,728,549 A | | 3/1988 | Shimizu et al. ................ 428/35 |
| 5,068,136 A | | 11/1991 | Yoshida et al. ............ 428/35.7 |
| 5,085,821 A | * | 2/1992 | Nohara ........................ 264/515 |
| 5,232,754 A | * | 8/1993 | Waugh ........................ 428/367 |
| 5,955,527 A | * | 9/1999 | Cochran et al. ............. 524/413 |

FOREIGN PATENT DOCUMENTS

| | | |
|---|---|---|
| CA | 1167215 | 5/1984 |
| GB | 2 078 171 A | 1/1982 |
| JP | 56 064839 A | 6/1981 |
| JP | 3-247437 A | * 11/1991 |
| JP | 11-165330 A | * 6/1999 |
| JP | 2000-168017 A | * 6/2000 |

* cited by examiner

*Primary Examiner*—Sandra M. Nolan
(74) *Attorney, Agent, or Firm*—Oliff & Berridge, PLC

(57) ABSTRACT

A laminated plastic molded body of the present invention comprises a laminated plastic molded body having a layered structure portion of three-layers or five-layers in which a resin layer A and a resin layer B are alternatively laminated, wherein the resin layer A provided at least at the surface side of the layered structure portion is a mixed resin layer of a poly(ethylene terephthalate) resin and at least one resin selected from the group consisting of an amorphous polyester resin, an ethylene naphthalate-ethylene terephthalate copolymer resin and a meta-xylene group-containing polyamide resin, and the resin layer B interposed between the resin layers A is a barrier resin layer comprising at least one resin selected from the group consisting of a meta-xylene group-containing polyamide resin and an ethylene-vinyl alcohol copolymer resin. Thus, a multi-layer laminated plastic container having highly gas barrier properties against oxygen and carbon dioxide gases, and yet transparency, excellent characteristics in mechanical properties, and having food hygiene properties can be provided.

12 Claims, 1 Drawing Sheet

LAMINATED PLASTIC MOLDED BODY

TECHNICAL FIELD

This invention relates to laminated plastic molded bodies having extremely high gas barrier properties against oxygen and carbon dioxide gases, being transparent, having excellent mechanical properties and having food hygiene properties.

BACKGROUND ART

Various kinds of plastic containers have been on the market as a container for, for example, foods, drinks, cosmetics, chemicals or the like, since they have a light weight, a less danger of breakage, a low cost and the like. In particular, plastic containers made of poly(ethylene terephthalate) resins have an excellent transparency and show a beautiful appearance similar to glass bottles, so that they have been generally used as a container for drinks.

The above-mentioned plastic molded bodies made of the poly(ethylene terephthalate) resins are insufficient in the gas barrier properties against oxygen and carbon dioxide gases. Thus, by making a laminated plastic molded body in which the poly(ethylene terephthalate) resin layer and the other thermoplastic gas barrier resin layer are laminated, the body can be made suitable for its contents which require gas barrier properties.

However, lamination of the thermoplastic gas barrier resin layer causes problems of lowering in mechanical properties and lowering in transparency, so that a film thickness of the gas barrier resin layer to be laminated is inherently limited. Thus, with regard to its contents to be contained which require particularly excellent gas barrier properties, it is the present status that there is still a problem in its shelf life.

DISCLOSURE OF THE INVENTION

Thus, with regard to the conventional laminated plastic body in which the above-mentioned poly(ethylene terephthalate) resin layer and the thermoplastic gas barrier resin layer are laminated, the portion corresponding to the poly(ethylene terephthalate) resin layer is replaced by a mixed resin layer comprising the poly(ethylene terephthalate) resin and a specific resin, so that gas barrier properties can be markedly improved without lowering marked mechanical properties or lowering in transparency. Thus, it can be confirmed that the resulting body becomes a laminated plastic molded body in which a shelf life of a content which requires gas barrier properties can be markedly improved whereby the inventors have accomplished the present invention.

Accordingly, an object of the present invention is to provide laminated plastic molded bodies having extremely high gas barrier properties against oxygen and carbon dioxide gases, having excellent mechanical properties and having food hygiene properties.

To accomplish the above-mentioned objects, the present invention comprises the following constitution.

That is, the laminated plastic molded bodies of the present invention are laminated plastic molded bodies having a layered structure portion of three-layers or five-layers in which a resin layer A and a resin layer B are alternatively laminated, wherein the resin layer A provided at least at the surface side of the layered structure portion comprises a mixed resin layer of a poly(ethylene terephthalate) resin and at least one resin selected from the group consisting of an amorphous polyester resin, an ethylene naphthalate-ethylene terephthalate copolymer resin and a meta-xylene group-containing polyamide resin, and the resin layer B interposed between the resin layers A comprises a barrier resin layer comprising at least one resin selected from the group consisting of a meta-xylene group-containing polyamide resin and an ethylene-vinyl alcohol copolymer resin.

In the laminated plastic molded bodies having the above-mentioned constitution, the above-mentioned poly(ethylene terephthalate) resin preferably comprises a resin in which 80 mol % or more, preferably 90 mol % or more of a dicarboxylic acid component constituting the polymer is a terephthalic acid unit, and 80 mol % or more, preferably 90 mol % or more of a dialcohol component constituting the polymer is an ethylene glycol unit.

Moreover, the above-mentioned amorphous polyester resin is preferably an amorphous polyester resin obtained by copolymerizing at least one copolymer component selected from the group consisting of isophthalic acid, diphenyl ether 4,4-dicarboxylic acid, naphthalene-1,4-dicarboxylic acid, naphthalene-2,6-dicarboxylic acid, adipic acid, sebacic acid, decan-1,10-dicarboxylic acid, hexahydroterephthalic acid, propylene glycol, 1,4-butanediol, neopentyl glycol, diethylene glycol, 1,4-cyclohexanedimethanol, 2,2-bis(4-hydroxyphenyl)propane and 2,2-bis(4-hydroxyethoxyphenyl)propane, etc., in addition to terephthalic acid and ethylene glycol.

Incidentally, as the amorphous polyester resin, for example, a gas barrier polyester resin commercially available as Mitsui B-010 manufactured by Mitsui Kagaku Co., Ltd., or a polyester type gas barrier resin commercially available as RB8550 manufactured by Toyo Boseki Co., Ltd. can be used.

Moreover, it is preferred that the above-mentioned ethylene naphthalate-ethylene terephthalate copolymer resin is a copolymer resin comprising 5 to 45 mol % of an ethylene naphthalate unit and 95 to 55 mol % of an ethylene terephthalate unit. This is because, in these ranges, compatibility with the poly(ethylene terephthalate) resin becomes good and improvement in the barrier characteristics of the resin layer A by mixing said copolymer resin can be realized.

Furthermore, it is preferred that the above-mentioned meta-xylene group-containing polyamide resin is a polyamide resin comprising a polymer containing 70 mol % or more of an amide unit obtained from meta-xylylene diamine alone, or a mixed xylylenediamine containing meta-xylylenediamine and 30 mol % or less of para-xylylenediamine based on the total xylylenediamine and α·ω-aliphatic dicarboxylic acid having 6 to 10 carbon atoms.

Moreover, it is preferred that, in the resin forming the mixed resin layer, at least one resin selected from the group consisting of the amorphous polyester resin, ethylene naphthalate-ethylene terephthalate copolymer resin and meta-xylene group-containing polyamide resin is contained in an amount of 5 to 45% by weight. This is because, when the compounding amount is less than 5% by weight, improvement in barrier properties due to the mixed resin layer is not remarkable, while when it exceeds 45% by weight, moldability of said mixed resin layer becomes poor whereby unevenness in film thickness is liable to be caused and the molding step is liable to become unstable. From the same point of view, the compounding amount thereof is preferably 5 to 20% by weight.

Moreover, a weight of the resin forming the above-mentioned resin layer B is preferably 2 to 25% based on the weight of the resin forming the resin layer A and the resin layer B. This is because the meta-xylene group-containing polyamide resin or die ethylene-vinyl alcohol copolymer resin to be used for forming the resin layer B shows an excellent gas barrier properties by a single resin layer made of the resin, but the presence of the resin layer causes lowering in mechanical properties or lowering in transparency, so that these disadvantages can be avoided by decreasing the amount of these resins.

Also, it is preferred that the above-mentioned laminated plastics molded body is a container, and at least a body portion and a bottom portion of the above-mentioned container are constituted by the above-mentioned layered portion.

Moreover, the resin layer B provided by being interposed between the resin layers A comprises a barrier resin layer comprising at least one resin selected from the group consisting of a meta-xylene group-containing polyamide resin and an ethylene-vinyl alcohol copolymer resin. The meta-xylene group-containing polyamide resin is a generally used resin as a barrier resin. Preferred examples of the resin are the same as the meta-xylene group-containing polyamide resin to be used in the mixed resin layer constituting the above-mentioned resin layer A. On the other hand, the ethylene-vinyl alcohol copolymer resin is also generally used resin as a barrier resin. In the points of moldability and gas barrier properties, it is preferred to use an ethylene-vinyl alcohol copolymer resin containing 50 to 70 mol % of a vinyl alcohol unit.

As mentioned above, in the laminated plastic molded body of the present invention, by making the resin layer A a mixed resin layer of the poly(ethylene terephthalate) resin and a specific resin which is less worsen the moldability of the poly(ethylene terephthalate) resin and has high gas barrier properties and nontoxicity, and laminating it with the resin layer B, without accompanying marked lowering in mechanical properties or lowering in transparency, the gas barrier properties which are not affected by the circumferential atmosphere can be markedly improved when the molded body is a container, etc.

The laminated plastic molded body of the present invention can be molded by the same molding means as in the conventional molded body of a laminated plastic container comprising the poly(ethylene terephthalate) resin layer and the other thermoplastic gas barrier resin layer, i.e., by a direct blow molding, a parison blow molding or a biaxial drawing blow molding, etc. The biaxial drawing blow molding is preferred since more preferred mechanical properties can be obtained.

BEST MODE FOR CARRYING OUT THE INVENTION

Figure 1:
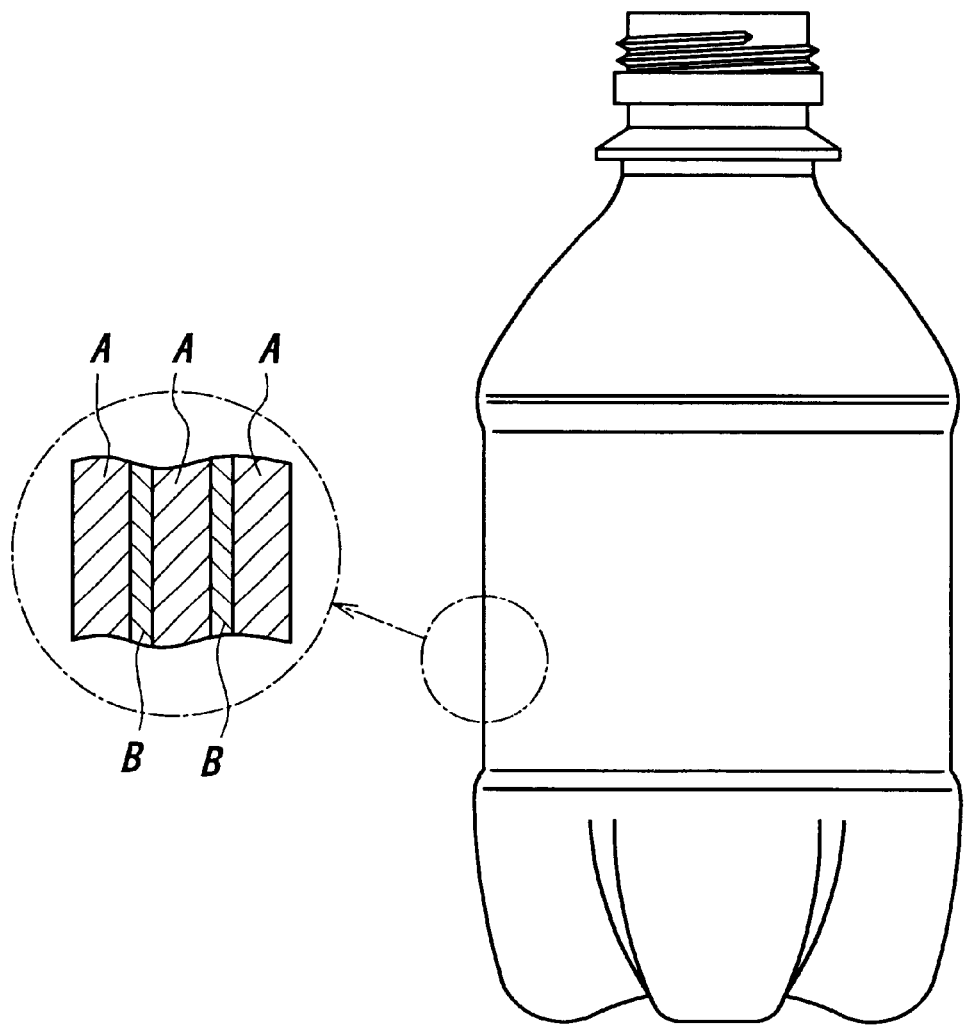
FIG. 1 is a front view showing an outline shape of the laminated plastic container molded in Example 1.

In the following, manufacturing examples of a container as a specific constitution of the laminated plastic molded body of the present invention are explained, and an oxygen barrier property of said laminated plastic molded body is also explained.

EXAMPLE 1

By utilizing a mixed resin for forming a resin layer A comprising 90 parts by weight of a poly(ethylene terephthalate) resin (RT-543SR, available from Nippon Unipet Co., Ltd.) and 10 parts by weight of an amorphous polyester resin (B-010, available from Mitsui Kagaku Co., Ltd.) which is a copolymer of terephthalic acid, isophthalic acid, ethylene glycol and other diol component, etc., and a resin for forming a resin layer B comprising a poly(meta-xylylene adipamide) resin (MDX-6(6007), available from Mitsubishi Gas Kagaku Co., Ltd.), a parison having a bottom comprising a five-layer structure of a resin layer A (the first layer)-a resin layer B (the second layer)-a resin layer A (the third layer)-a resin layer B (the fourth layer)-a resin layer A (the fifth layer) having a length of 10 cm (including a bottleneck portion) and having a weight of 32 g was molded by injection molding.

Incidentally, injection molding was carried out with a resin temperature of 286° C. at the side of the resin layer A and 280° C. at the side of the resin layer B. Also, the first layer and the fifth layer were made each 30% based on the total weight of the parison, the second layer and the fourth layer were made each 4.15% based on the same and the third layer was made 31.7% based on the same.

Then, the above-mentioned parison having the bottom was subjected to a biaxial drawing blow molding in a mold for blow molding, a laminated plastic container having a shape as shown in FIG. 1 with a volume of 500 ml, a height of 20 cm and a diameter at the center portion in the longwise direction at the center of the trunk portion for adhering a label of 6.7 cm was obtained.

COMPARATIVE EXAMPLE 1

A parison having a bottom with a weight of 32 g was molded by injection molding using a poly(ethylene terephthalate) resin (RT-543SR, available from Nippon Unipet Co., Ltd.), and then, the parison was subjected to a biaxial drawing blow molding in the same manner as in Example 1 to obtain a plastic container for comparison.

COMPARATIVE EXAMPLE 2

A parison having a bottom with a weight of 32 g was molded by injection molding using an ethylene naphthalate-ethylene terephthalate copolymer resin comprising 8 mol % of an ethylene naphthalate unit and 92 mol % of an ethylene terephthalate unit, and then, the parison was subjected to a biaxial drawing blow molding in the same manner as in Example 1 to obtain a plastic container for comparison.

COMPARATIVE EXAMPLE 3

A parison having a bottom with a weight of 32 g was molded by injection molding using a mixed resin comprising 90 parts by weight of a poly(ethylene terephthalate) resin (RT-543SR, available from Nippon Unipet Co., Ltd.) and 10 parts by weight of an amorphous polyester resin (B-010, available from Mitsui Chemical Co., Ltd.) which is a copolymer of terephthalic acid, isophthalic acid, ethylene glycol and other diol component, etc., and then, the parison was subjected to a biaxial drawing blow molding in the same manner as in Example 1 to obtain a plastic container for comparison.

COMPARATIVE EXAMPLE 4

By using a poly(ethylene terephthalate) resin (RT-543SR, available from Nippon Unipet Co., Ltd.) as a resin for forming a first layer and an amorphous polyester resin (B-010, available from Mitsui Kagaku Co., Ltd.) which is a copolymer of terephthalic acid, isophthalic acid, ethylene glycol and other diol component, etc., as a resin for forming a second layer, a parison having a bottom with a weight of 32 g comprising a three-layered structure of an outermost layer made of the resin for forming the first layer—an intermediate layer made of the resin for forming the second layer—an innermost layer made of the resin for forming the first layer was molded by injection molding.

Incidentally, the outermost layer and the innermost layer were made each 45.85% based on the total weight of the parison, and the intermediate layer was made 8.3% based on the same.

Then, the parison was subjected to a biaxial drawing blow molding in the same manner as in Example 1 to obtain a plastic container for comparison.

COMPARATIVE EXAMPLE 5

By using a poly(ethylene terephthalate) resin (RT-543SR, available from Nippon Unipet Co., Ltd.) as a resin for forming a first layer and an amorphous polyester resin (B-010, available from Mitsui Kagaku Co., Ltd.) which is a copolymer of terephthalic acid, isophthalic acid, ethylene glycol and other diol component, etc., as a resin for forming a second layer, a parison having a bottom with a weight of 32 g comprising a five-layer structure of an outermost layer made of the resin for forming the first layer (the first layer)—an intermediate layer made of the resin for forming the second layer(the second layer)—a center layer made of the resin for forming the first layer (the third layer)—an intermediate layer made of the resin for forming the second layer(the fourth layer)—an innermost layer made of the resin for forming the first layer (the fifth layer) was molded by injection molding.

Incidentally, the first layer and the fifth layer were made each 30% based on the total weight of the parison, the second layer and the fourth layer were made each 4.15% based on the same and the third layer was made 31.7% based on the same.

Then, the parison was subjected to a biaxial drawing blow molding in the same manner as in Example 1 to obtain a plastic container for comparison.

COMPARATIVE EXAMPLE 6

By using a poly(ethylene terephthalate) resin (RT-543SR, available from Nippon Unipet Co., Ltd.) as a resin for forming a first layer and a polymetaxylylene adipamide resin (MXD-6(6007), available from Mitsubishi Gas Kagaku Co., Ltd.) as a resin for forming a second layer, a parison having a bottom with a weight of 32 g comprising a five-layer structure of an outermost layer made of the resin for forming the first layer (the first layer)—an intermediate layer made of the resin for forming the second layer(the second layer)—a center layer made of the resin for forming the first layer (the third layer)—an intermediate layer made of the resin for forming the second layer(the fourth layer)—an innermost layer made of the resin for forming the first layer (the fifth layer) was molded by injection molding.

Incidentally, the first layer and the fifth layer were made each 30% based on the total weight of the parison, the second layer and the fourth layer were made each 4.15% based on the same and the third layer was made 31.7% based on the same.

Then, the parison was subjected to a biaxial drawing blow molding in the same manner as in Example 1 to obtain a plastic container for comparison.

COMPARATIVE EXAMPLE 7

By using a poly(ethylene terephthalate) resin (RT-543SR, available from Nippon Unipet Co., Ltd.) as a resin for forming a first layer and a polymetaxylylene adipamide resin (MXD-6(6007), available from Mitsubishi Gas Kagaku Co., Ltd.) as a resin for forming a second layer, a parison having a bottom with a weight of 32 g comprising a five-layer structure of an outermost layer made of the resin for forming the first layer (the first layer)—an intermediate layer made of the resin for forming die second layer(the second layer)—a center layer made of the resin for forming the first layer (the third layer)—an intermediate layer made of the resin for forming the second layer(the fourth layer)—an innermost layer made of the resin for forming the first layer (the fifth layer) was molded by injection molding.

Incidentally, the first layer and the fifth layer were made each 35% based on the total weight of the parison, the second layer and the fourth layer were made each 2.5% based on the same and the third layer was made 25% based on the same.

Then, the parison was subjected to a biaxial drawing blow molding in the same manner as in Example 1 to obtain a plastic container for comparison.

Test 1

An oxygen permeation amount of the respective plastic containers obtained in the above-mentioned Example 1, and Comparative Example 1 to Comparative Example 7 was measured by making the atmosphere outside said plastic container 23° C., 55%RH and the atmosphere inside said plastic container 23° C., 100%RH. The measured results are shown in Table 1 and also a ratio of the oxygen permeation amount and a ratio of shelf life based on the plastic container comprising a single layer of a poly(ethylene terephthalate) resin as a standard are shown.

TABLE 1

| No. | Oxygen permeation amount (cc/day) | Ratio of oxygen permeation amount | Ratio of shelf life |
| --- | --- | --- | --- |
| Example 1 | 0.004 | 0.13 | 7.5 |
| Comparative Example 1 | 0.030 | 1.00 | 1 |
| Comparative Example 2 | 0.026 | 0.85 | 1.17 |
| Comparative Example 3 | 0.024 | 0.80 | 1.25 |
| Comparative Example 4 | 0.027 | 0.90 | 1.11 |
| Comparative Example 5 | 0.026 | 0.87 | 1.15 |
| Comparative Example 6 | 0.008 | 0.27 | 3.75 |
| Comparative Example 7 | 0.014 | 0.47 | 2.13 |

INDUSTRIAL APPLICABILITY

According to the present invention, a molded body such as a laminated plastic container, etc., having barrier properties far excellent than expected can be provided without accompanying remarkable decrease in mechanical properties or decrease in transparency by mixing a specific resin which has less degree of worsening moldability of the poly(ethylene terephthalate) resin, does not cause any bad effect to food hygiene properties and is a thermoplastic resin having good gas barrier properties with a poly(ethylene terephthalate) resin to prepare a mixed resin layer and laminating it with a barrier resin layer.

Accordingly, the laminated plastic molded body of the present invention is extremely high in gas barrier properties against oxygen and carbon dioxide gases. Thus, it is suitable for a plastic container for filling a content in which extremely high barrier properties against oxygen and carbon dioxide gases are required, for example, for a plastic container having a relatively small capacity in which a ratio of a contacting surface area to outside air based on the weight of the content becomes large, so that the laminated plastic molded body of the present invention can be markedly improved in shelf life.

Moreover, the surface side of the laminated plastic molded body of the present invention is made of a mixed resin layer which is nonpoisonous and having food hygiene properties, so that it can be suitably used for applying to foods and drinks.

What is claimed is:

1. A laminated plastic molded body having a layered structure portion of three-layers or five-layers in which a resin layer A and a resin layer B are alternatively laminated, wherein:

the resin layer A provided at least at the surface side of the layered structure portion is a mixed resin layer of a poly(ethylene terephthalate) resin and at least one additional resin selected from the group consisting of an amorphous polyester resin, an ethylene naphthalate-ethylene terephthalate copolymer resin and a meta-xylene group-containing polyamide resin, said mixed resin layer containing said at least one additional resin in an amount of 5 to 45% by weight, and the resin layer B interposed between the resin layers A is a barrier resin layer comprising at least one resin selected from the group consisting of a meta-xylene group-containing polyamide resin and an ethylene-vinyl alcohol copolymer resin.

2. A laminated plastic molded body according to claim 1, wherein the poly(ethylene terephthalate) resin is a resin in which 80 mol % or more of a dicarboxylic acid component constituting the polymer is a terephthalic acid unit, and 80 mol % or more of a dialcohol component constituting the polymer is an ethylene glycol unit.

3. A laminated plastic molded body according to claim 2, wherein 90 mol % or more of the dicarboxylic acid component is a terephthalic acid unit, and 90 mol % or more of the dialcohol component is an ethylene glycol unit.

4. A laminated plastic molded body according to claim 1, wherein the amorphous polyester resin is an amorphous polyester resin obtained by copolymerizing at least one copolymer component selected from the group consisting of isophthalic acid, diphenyl ether 4,4-dicarboxylic acid, naphthalene-1,4-dicarboxylic acid, naphthalene-2,6-dicarboxylic acid, adipic acid, sebacic acid, decan-1,10-dicarboxylic acid, hexahydroterephthalic acid, propylene glycol, 1,4-butanediol, neopentyl glycol, diethylene glycol, 1,4-cyclohexanedimethanol, 2,2-bis(4-hydroxyphenyl)propane and 2,2-bis(4-hydroxyethoxyphenyl)propane, in addition to terephthalic acid and ethylene glycol.

5. A laminated plastic molded body according to claim 1, wherein the ethylene naphthalate-ethylene terephthalate copolymer resin is a copolymer resin containing 5 to 45 mol % of an ethylene naphthalate unit and 95 to 55 mol % of an ethylene terephthalate unit.

6. A laminated plastic molded body according to claim 1, wherein the meta-xylene group-containing polyamide resin is a polyamide resin comprising a polymer containing 70 mol % or more of an amide unit obtained from meta-xylylene diamine alone, or a mixed xylylenediamine containing meta-xylylenediamine and 30 mol % or less of paraxylylenediamine based on the total xylylenediamine and $\alpha,\omega$-aliphatic dicarboxylic acid having 6 to 10 carbon atoms.

7. A laminated plastic molded body according to claim 1, wherein said amount is 5 to 20% by weight.

8. A laminated plastic molded body according to claim 1, wherein the weight of the resin forming the resin layer B is 2 to 25% based on the weight of the resin forming the resin layer A and the resin layer B.

9. A laminated plastic molded body according to claim 1, wherein the laminated plastic molded body is a container.

10. A laminated plastic molded body according to claim 9, wherein at least a trunk portion and a bottom portion of the container are constituted by the layered portion.

11. A laminated plastic molded body according to claim 1, wherein said layered structure portion has three alternating layers of said resin A and said resin B.

12. A laminated plastic molded body according to claim 1, wherein said layered structure portion has five alternating layers of said resin A and said resin B.

* * * * *